(12) United States Patent
Stefano

(10) Patent No.: US 11,541,952 B2
(45) Date of Patent: Jan. 3, 2023

(54) TRACK SYSTEM COMPRISING A SENSOR AND VEHICLE COMPRISING THE SAME

(71) Applicant: CNH Industrial America LLC, New Holland, PA (US)

(72) Inventor: Fiorati Stefano, Poggio Renatico (IT)

(73) Assignee: CNH Industrial America LLC, New Holland, PA (US)

( * ) Notice: Subject to any disclaimer, the term of this patent is extended or adjusted under 35 U.S.C. 154(b) by 984 days.

(21) Appl. No.: 16/328,191

(22) PCT Filed: Aug. 24, 2017

(86) PCT No.: PCT/EP2017/071378
§ 371 (c)(1),
(2) Date: Feb. 25, 2019

(87) PCT Pub. No.: WO2018/037095
PCT Pub. Date: Mar. 1, 2018

(65) Prior Publication Data
US 2019/0233030 A1   Aug. 1, 2019

(30) Foreign Application Priority Data
Aug. 25, 2016 (IT) .................. 102016000087275

(51) Int. Cl.
*B62D 55/14* (2006.01)
*B62D 55/08* (2006.01)
*B62D 55/104* (2006.01)
*G01K 3/14* (2006.01)
*F16D 66/00* (2006.01)
*B62D 55/065* (2006.01)

(52) U.S. Cl.
CPC ............. *B62D 55/14* (2013.01); *B62D 55/08* (2013.01); *B62D 55/104* (2013.01); *G01K 3/14* (2013.01); *B62D 55/065* (2013.01); *F16D 2066/001* (2013.01)

(58) Field of Classification Search
CPC ............................... B62D 55/14; B62D 55/08
See application file for complete search history.

(56) References Cited

U.S. PATENT DOCUMENTS

| 2013/0255354 | A1* | 10/2013 | Hawkins | ............... | B62D 55/15 |
| | | | | | 305/15 |
| 2015/0081166 | A1* | 3/2015 | Diekevers | ............. | B62D 55/14 |
| | | | | | 701/34.4 |
| 2015/0321710 | A1* | 11/2015 | Zuchoski | ............... | B62D 65/00 |
| | | | | | 29/894 |

FOREIGN PATENT DOCUMENTS

CN        204228297 U  *  3/2015

* cited by examiner

*Primary Examiner* — Jacob D Knutson
(74) *Attorney, Agent, or Firm* — Rickard K. DeMille; Rebecca L. Henkel

(57) ABSTRACT

A track system for a rubber tracked work vehicle comprises temperature sensor and an antenna attached to a track wheel. The antenna is connected to the temperature sensor to transmit to a receiver a temperature signal generated by the temperature sensor. A work vehicle comprising the track system and a temperature measuring method are also disclosed.

7 Claims, 4 Drawing Sheets

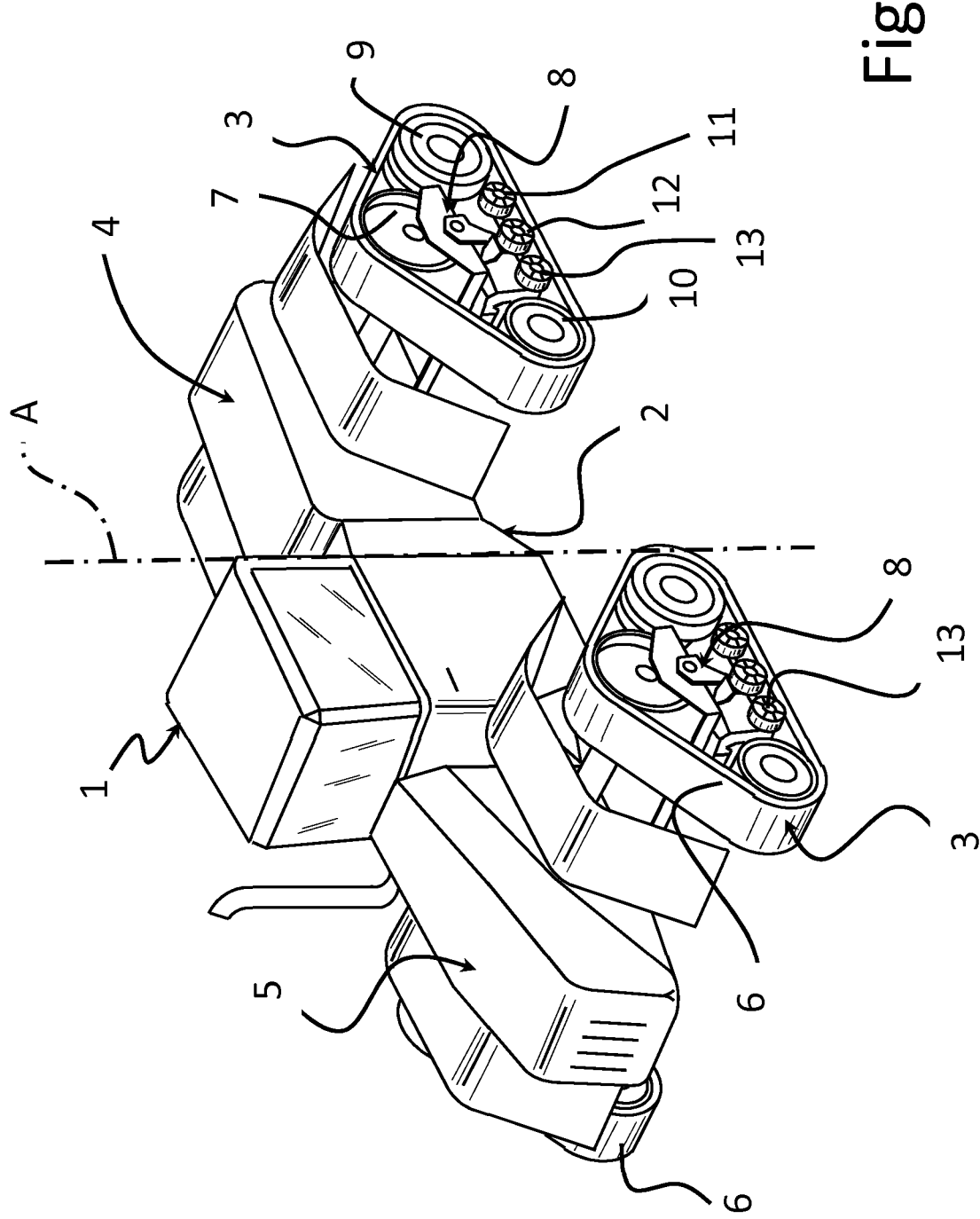

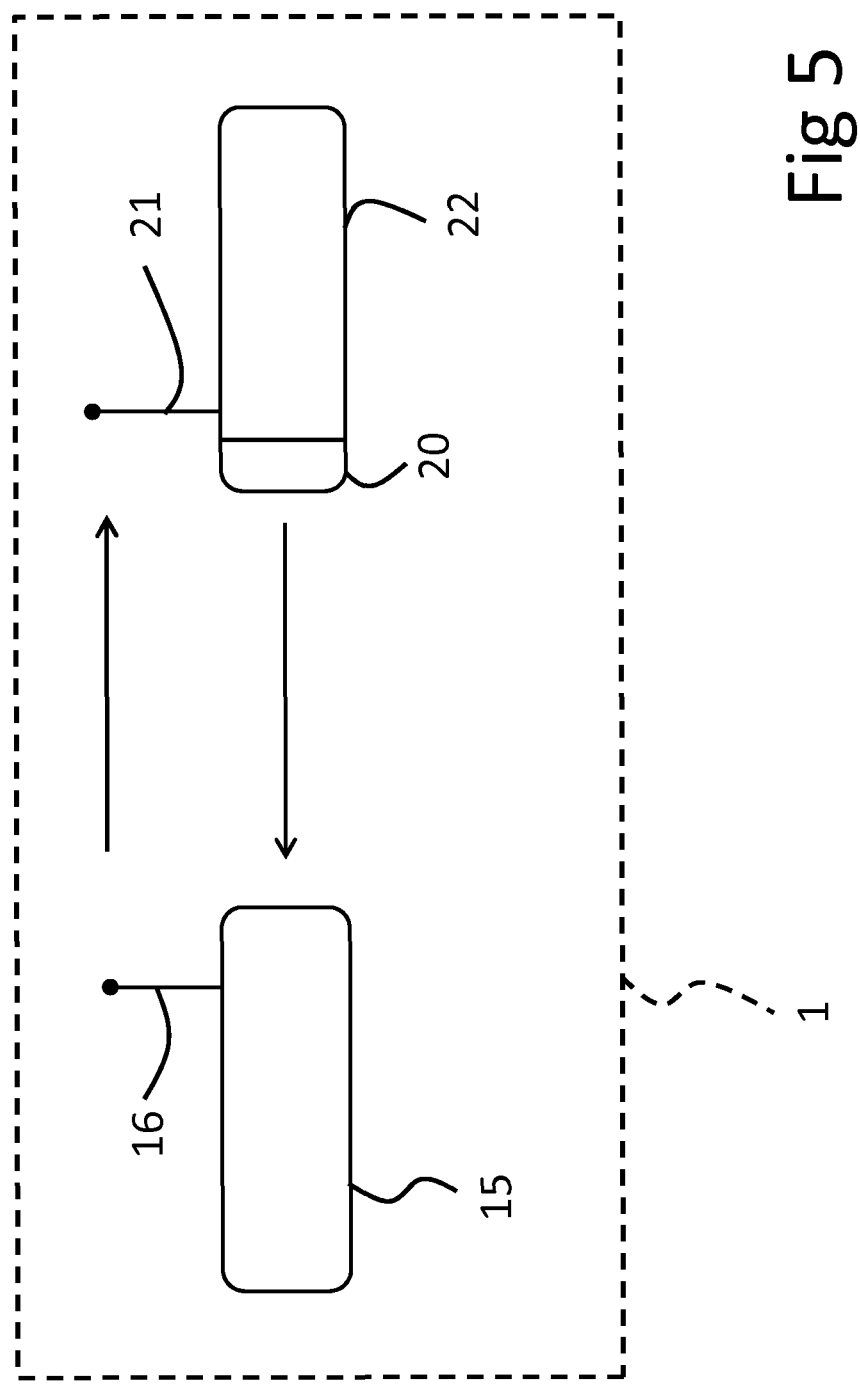

TRACK SYSTEM COMPRISING A SENSOR AND VEHICLE COMPRISING THE SAME

CROSS REFERENCE TO RELATED APPLICATIONS

This application is a US National Stage filing of International Application Serial No. PCT/EP2017/071378 entitled "TRACK SYSTEM COMPRISING A SENSOR AND VEHICLE COMPRISING THE SAME," filed Aug. 24, 2017, which claims priority to Italian Application Serial No. 102016000087275, filed Aug. 25, 2016, each of which is incorporated by reference herein in its entirety for all purposes.

FIELD OF THE INVENTION

The present invention relates to a rubber track suspension for a tracked vehicle, in particular a work vehicle such as a construction equipment vehicle or a military tracked vehicle, or an agricultural vehicle, e.g. a combined harvester or the like.

BACKGROUND OF THE INVENTION

A tracked work vehicle is provided with an undercarriage suspension in order to increase adhesion and traction performances on soft grounds, such as grounds affected by a relatively high degree of humidity or grounds having a relatively high quantity of sand.

A rubber tracked vehicle is preferred to satisfy the additional need for a relatively high speed on paved streets, e.g. during a travel of the work vehicle to and from a construction site or a cultivated field. Furthermore, a rubber track tends to be relatively less expensive than other tracks. A rubber track of the vehicle is guided by wheels during a traction condition of the vehicle and, in such condition, heat generates due to friction between the track and the wheels.

Overheating of the rubber track and, in particular, the wheels is experienced during certain working conditions, e.g. during an extensive use on a paved street. Overheating is disadvantageous because track and roller wear increases and, therefore, the cost and time for maintenance of the vehicle are increased as well.

The above in particular applies when a roller wheel, i.e. wheel having the smallest diameter compared to other wheels, comprises an outer polymeric layer contacting the rubber track. It is important to preserve such polymeric layer during functioning.

SUMMARY OF THE INVENTION

The scope of the present invention is achieved by a rubber track suspension according to claim 1, by a vehicle according to claim 7 and by methods according to claims 9 and 10. In particular, according to the invention, a suspension of a rubber tracked work vehicle comprises temperature sensor and an antenna attached to a track wheel, the antenna being connected to the temperature sensor to transmit to a receiver a temperature signal generated by the temperature sensor.

According to a preferred embodiment, the suspension comprises an RF-powered circuit to connect the temperature sensor with the antenna and suitable to be powered by an electromagnetic radiation in order to transmit the temperature signal via the antenna.

According to another embodiment, the wheel comprises a crown supported on a rolling frame and contacting the track; and the frame defines a seat housing a detector of the sensor.

According to a further embodiment, the seat is a through hole within the frame such that the detector is in contact with the crown.

BRIEF DESCRIPTION OF THE DRAWINGS

For a better understanding of the present invention, the latter will further be disclosed with reference to the accompanying figures in which:

FIG. 1 shows a rubber tracked work vehicle equipped with the present invention;

FIG. 5 is a block diagram of a transmitter and receiver system according to the invention.

DETAILED DESCRIPTION OF THE DRAWINGS

Figure 3:
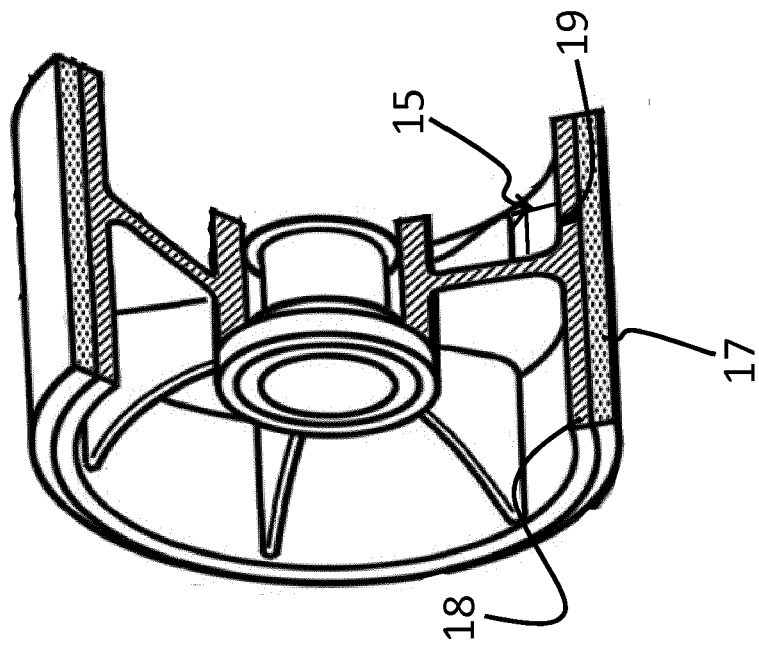
FIG. 3 is a partial cross section according to line III-Ill of FIG. 2.
Figure 2:
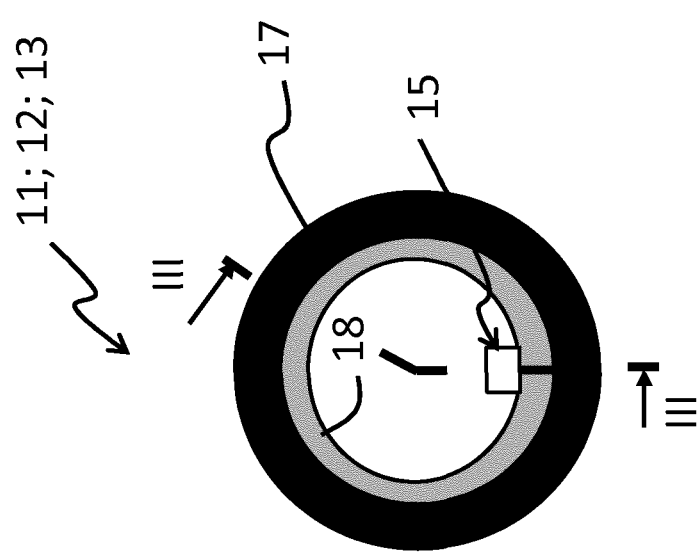
FIG. 2 is a non-scaled sketch of a track roller equipped with a sensor according to the invention.

FIG. 1 refers, as a whole, to a work vehicle 1 comprising a frame 2 and at least two rubber tracked, preferably four, track systems 3 attached to frame 2.

Frame 2 can be a rigid frame and in this case the vehicle may be provided with steering wheels (not shown); or a hinged frame having a front part 4, a rear part 5 hinged to front part 4 about axis A and a steering unit (not shown), preferably a hydraulic steering unit comprising linear actuators, to control the relative angular position of front part 4 with respect to rear part 5 about axis A.

Each track system 3 comprises a rubber track 6, a drive wheel 7 extending from a differential (not shown) for driving track 6 and an undercarriage 8 pivoting with respect to frame 2. Undercarriage 8 comprises a front idler wheel 9, a rear idler wheel 10 about which track 6 is wrapped, one or more roller wheels 11, 12, 13 for guiding track 6, all of which are supported by undercarriage 8, which extends fore-and-aft, and to which wheels 9, 10, 11, 12, 13 are attached. While the "front idler wheel," "rear idler wheel," "roller wheel" are singular terms, a plurality of wheels are provided at each relative position in side-to-side orientation, such as in this embodiment. In particular, at least roller wheels 11, 12, 13 are adjacent along the fore-and-aft direction.

In particular, the undercarriage 8 is connected to frame 2 in order to tilt in a plane parallel to axis A and oriented fore-and-aft when vehicle 1 travels along a straight path.

According to the present invention, the suspension is equipped with a temperature sensor 15 for detection of a temperature representative of the temperature in the contact zone between a wheel 11, 12, 13 and rubber track 6; and a wireless transmitter or antenna 16 to send the signal of temperature sensor 15 to a receiver.

Temperature sensor 15 and wireless transmitter 16 can be powered either by a mechanical energy harvester, i.e. a mechanical to electrical energy converter, or by a passive circuit, preferably and RF-powered passive circuit, wherein an induced electric current flows when illumination by an electromagnetic radiation of a suitable power and frequency occurs.

When sensor 15 and antenna 16 are powered by a mechanical energy harvester, e.g. a micro-electro-mechanical-system (MEMS) energy harvester, the harvester is attached to a moving member of suspension 3 so that, when the vehicle travels, mechanical energy for the functioning of temperature sensor 15 is harvested. For example, the mechanical energy harvester can be attached to one of wheels 11, 12, 13.

In case of RF-powered circuit, electric current induced by electromagnetic illumination is such to enable one or more of the following functions: power sensor 15 for temperature detection, power the RF electric circuit for transmission of the signal to antenna 16, power antenna 16 for transmission of a processed or unprocessed temperature signal.

In order to detect a temperature that is representative of the working condition in the contact zone between the wheel and rubber track 6, at least temperature sensor 15 and antenna 16 are on the wheel and/or on the attaching implements defining the revolution axis of the wheel in use. For example attaching implements comprise rolling or friction bearings and/or shafts and/or threaded connections. The wheel and the attaching implements are indeed proximal to the contact area with track 6 and, therefore, are mostly effected by the heat that is generated by friction of track 6 on the wheel.

According to a preferred embodiment of the invention, the wheel supporting temperature sensor comprises a crown insert 17 contacting rubber track 6. Crown insert 17 is mounted on a frame 18, in particular a casted metallic frame, rolling in use about attaching implements; and is preferably made of a polymeric material. In order to protect a temperature detector 19 of sensor 15, frame 18 has a hole, in particular a through hole, to house at least detector 19 so that the latter is proximal to or preferably contacts crown insert 17. In this way frame 18 and, where applicable, crown insert 17 define a protection from dirt, mud or the like and, at the same time, temperature detection is as close as possible to the area where the temperature is higher, i.e. the contact area between track 6 and crown insert 17. Furthermore, detector 19 is also proximal to or in contact with crown insert 17 in order to sense the temperature of the latter. This helps to monitor the wear caused by contact between track 6 and crown insert 17.

According to a preferred embodiment, track system 3 is configured such that, when vehicle is travelling on a paved street, at least front idler wheel 9, preferably also idler wheel 10, are lifted from the paved surface. Without a prejudice to the stability of the work vehicle, this decreases wear on rubber track 6. In such a configuration, it has been experienced that rollers 11, 12, 13 are heated more than other wheels. It is therefore preferable that sensor 15 is attached to at least one of roller wheels 11, 12, 13. In such an instance, it is also preferable that antenna 16 and, in view of the very limited room available, the RF-powered circuit as well are attached to the roller wheel.

Elevation of front idler wheel 9 and, possibly, of idler wheel 10 can be obtained according to a number of alternative ways. For example respective axes of rollers 11, 12, 13 are attached to a single walking beam that is hinged to undercarriage 8. Vertical position of the roller axes, walking beam and undercarriage 8 is defined by the position of the relative revolution axes of rollers 11, 12, 13 and tilting/hinge axes of the walking beam and undercarriage 8. It is therefore possible to have at least the front idler wheel 9 lifted from a paved street by assigning the position of the above mentioned axes and by assigning a respective diameter to idlers wheels 9, 10 and rollers 11, 12, 13.

Figure 4:
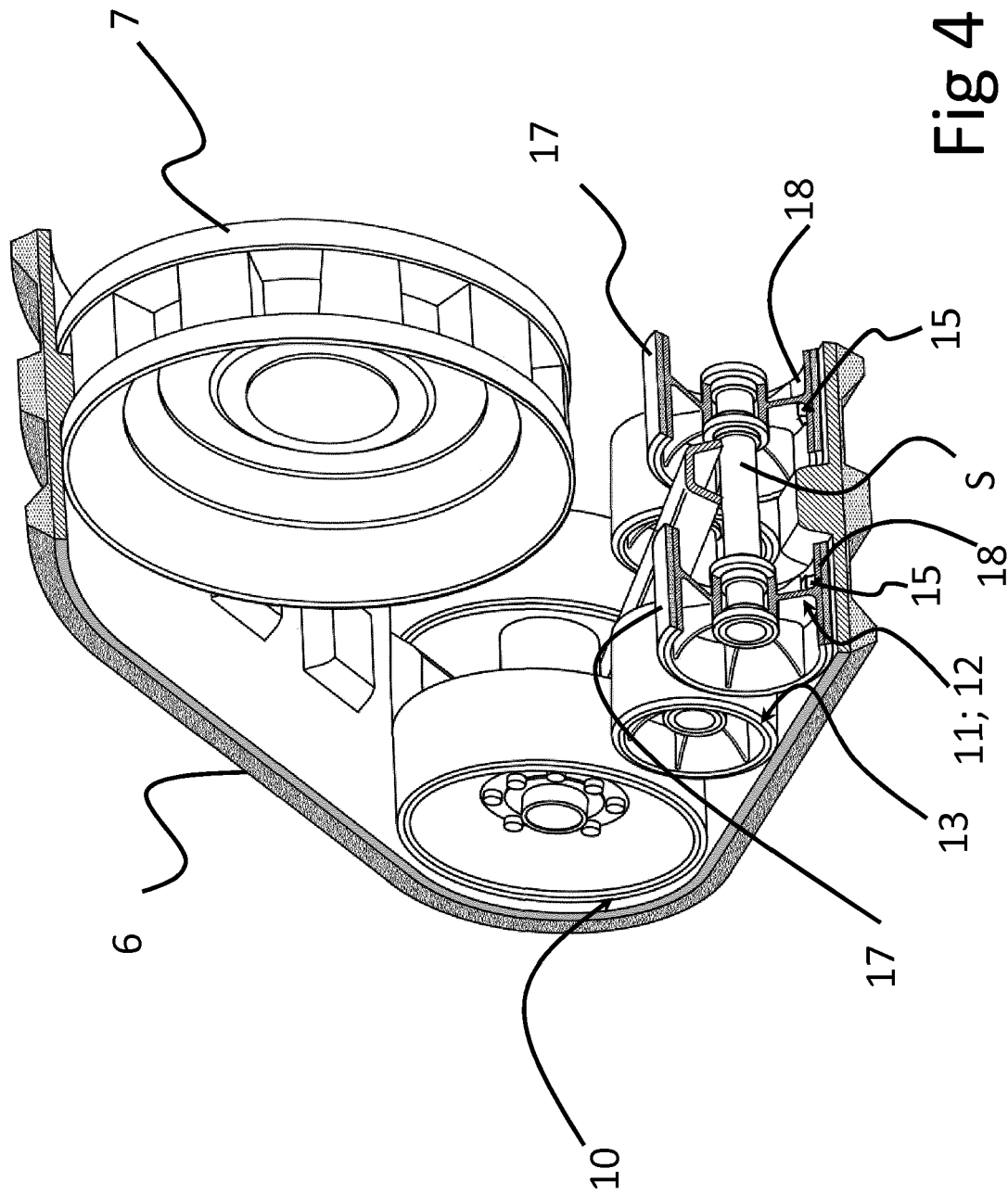
FIG. 4 is a schematic cross-section of a track system according to the present invention.

According to a preferred embodiment of the present invention, each wheel of a twin wheel comprises a respective sensor 15 and antenna 16. Accordingly, it is possible to measure the temperature differential between an outer wheel and an inner wheel and, thus, detect a possible misalignment of the twin wheel with respect to rubber track 6. This is in particular shown in FIG. 4, where roller wheels 11 comprises twin wheels connected by a shaft S, so that one twin wheel is an inner wheel and the other twin wheel is an outer wheel. An outer twin wheel is on the opposite side of frame 2 with respect to the respective inner twin wheel.

Furthermore, each adjacent twin roller wheel 11, 12, 13 has at least one sensor 15 and antenna 16 in order to measure differential temperature along the fore-aft direction.

By including an array of sensors and antennas on roller wheels 11, 12, 13 it is possible to detect a spatial temperature profile over the roller-track contact area. The temperature profile can be either along a direction or, when a larger number of sensors 15 is used, over the bi-dimensional surface contact area between crown inserts 17 and track 6. This helps to monitor the state of each crown insert 17 and avoid excessive wear of the latter. Preferably, the temperature profile is sensed over time and stored to provide a time history.

According to the sketch in FIG. 5, an electromagnetic illumination source 20, a receiver 21 including an antenna and an electronic control unit 22 interacting with antenna 16 are located on board of vehicle 1 and off suspension 3. It is therefore possible to limit the distance between antenna 16 and receiver 21 and, thus, require a relatively limited amount of power to energize illumination source 20. Preferably one or more of the illumination source 20, the receiver 21 and control unit 22 are powered by one electric circuit of the vehicle, in particular by a main electric circuit of vehicle 1. The main electric circuit of vehicle 1 is powered by a battery charged by an alternator.

Sensor 15, antenna 16 and either RF-powered circuit or the energy harvester can be provided on a new vehicle or suspension. As an alternative, it is possible, e.g. during maintenance, to provide an existing vehicle or suspension with sensor 15 and antenna 16 or with a wheel to which at least sensor 15 and antenna 16 are attached.

It is clear that changes and variations are applicable to the suspension according to the present invention without departing from the scope of protection as defined in the attached claims.

For example, track 6 can be arranged along a triangular path, as shown e.g. in FIG. 1, or along other paths. This may increase or reduce the number of idler wheels with respect to the embodiments discussed in the preceding paragraphs.

Sensor 15, RF-powered circuit and antenna 16 can be provided in a single pre-assembled unit before attaching to frame 18.

Signal processing, including conditioning, of temperature detector 19 can be operated either by a dedicated processor connected to antenna 16. Alternatively the dedicated processor can be connected to receiver 21 on board of vehicle 1 and off suspension 3.

The invention claimed is:

1. A track system for a work vehicle, comprising:
   at least one wheel comprising a polymeric crown insert;
   a rubber track contacting the crown insert; and
   a temperature sensor and an antenna both attached to the at least one wheel, the antenna being connected to the temperature sensor and configured to transmit to a receiver a temperature signal generated by the temperature sensor and indicative of a temperature of the crown insert;
   wherein the crown insert is supported on a rolling frame of the at least one wheel, the rolling frame defines a seat that houses a detector of the sensor to sense the temperature of the crown insert, and the seat is a through hole within the rolling frame such that the detector is in contact with the crown insert.

2. The track system of claim 1, further comprising an RF-powered circuit configured to connect the temperature sensor with the antenna and to be powered by an electromagnetic radiation so that the antenna transmits the temperature signal.

3. The track system of claim 1, wherein the at least one wheel is a twin wheel provided between a front wheel and a rear wheel to contact the rubber track, and wherein the at least one wheel is a roller wheel such that the front wheel is lifted when the rubber track contacts a horizontal paved street.

4. The track system of claim 1, wherein the rolling frame is made by casting.

5. A work vehicle comprising the track system of claim 1.

6. The work vehicle of claim 5, wherein the track system further comprises an RF-powered circuit configured to connect the temperature sensor with the antenna and to be powered by an electromagnetic radiation so that the antenna transmits the temperature signal, the work vehicle further comprising an illumination source configured to wirelessly energize the RF-powered circuit and the receiver to receive the temperature signal from the antenna.

7. A method, comprising:
  measuring a first temperature of a first contact area between a first crown insert of a first roller wheel and a rubber track of a track system and a second temperature of a second contact area between a second crown insert of a second roller wheel and the rubber track, wherein the first roller wheel and the second roller wheel are connected by a shaft;
  comparing the first temperature and the second temperature; and
  detecting misalignment of the first and second roller wheels and the rubber track based on the comparison.

* * * * *